(12) United States Patent
Bianchi et al.

(10) Patent No.: US 10,144,545 B2
(45) Date of Patent: Dec. 4, 2018

(54) DEVICE AND METHOD FOR FEEDING POUCHES TO A CAROUSEL

(71) Applicant: FILLSHAPE S.R.L., Zola Predosa (Bologna) (IT)

(72) Inventors: Paolo Bianchi, Corcagnano (IT); Filippo Furlotti, Località Cazzola (IT)

(73) Assignee: FILLSHAPE S.R.L., Zola Predosa (Bologna) (IT)

( * ) Notice: Subject to any disclaimer, the term of this patent is extended or adjusted under 35 U.S.C. 154(b) by 0 days.

(21) Appl. No.: 15/507,993

(22) PCT Filed: Jul. 28, 2015

(86) PCT No.: PCT/IB2015/055686
§ 371 (c)(1),
(2) Date: Mar. 1, 2017

(87) PCT Pub. No.: WO2016/034956
PCT Pub. Date: Mar. 10, 2016

(65) Prior Publication Data
US 2017/0283103 A1    Oct. 5, 2017

(30) Foreign Application Priority Data

Sep. 1, 2014 (IT) .............................. PR2014A0056

(51) Int. Cl.
*B65B 43/18* (2006.01)
*B65B 43/14* (2006.01)
(Continued)

(52) U.S. Cl.
CPC .............. *B65B 43/18* (2013.01); *B65B 43/14* (2013.01); *B65G 43/10* (2013.01); *B65G 47/06* (2013.01);
(Continued)

(58) Field of Classification Search
CPC ........ B65B 43/18; B65G 43/10; B65G 47/848
(Continued)

(56) References Cited

U.S. PATENT DOCUMENTS 1,764,663 A * 6/1930 Voigt ...................... B65B 19/10
                                                        198/359
3,107,393 A * 10/1963 Keller ..................... B26D 3/003
                                                        101/44
(Continued)

FOREIGN PATENT DOCUMENTS

DE       10127109 A1    12/2002
EP        0695703 A1     2/1996
(Continued)

OTHER PUBLICATIONS

International Search Report dated Oct. 27, 2015 re: Application No. PCT/162015/055686; pp. 1-3; citing: EP 0 872 421 A1, WO 2005/058704 A1.

*Primary Examiner* — Joseph A Dillon, Jr.
(74) *Attorney, Agent, or Firm* — Cantor Colburn LLP

(57) ABSTRACT

A method of supplying pouches intended for containing liquid, viscous, or granular products to a carousel includes the steps of: positioning pouches along a first zone that is part of a first feeding component for feeding the pouches to the carousel; moving the pouches in the first zone as far as the carousel; and picking up the pouches from the first zone via the carousel; The method further includes positioning pouches along a second zone that is part of a second feeding component for feeding the pouches to the carousel. The step of positioning pouches along the second zone occurs in part simultaneously with picking up the pouches from the first zone; moving the pouches located in the second zone as far as the carousel queuing the pouches behind the pouches
(Continued)

located in the first zone; and picking up the pouches from the second zone via the carousel.

9 Claims, 3 Drawing Sheets

(51) Int. Cl.
*B65G 43/10* (2006.01)
*B65G 47/06* (2006.01)
*B65G 47/84* (2006.01)

(52) U.S. Cl.
CPC .... *B65G 47/848* (2013.01); *B65G 2201/0235* (2013.01)

(58) Field of Classification Search
USPC .............................. 198/575, 576, 430, 418.7
See application file for complete search history.

(56) References Cited

U.S. PATENT DOCUMENTS

| | | | |
|---|---|---|---|
| 3,191,748 A * | 6/1965 | Le Roy | B65B 35/36 198/430 |
| 3,362,519 A * | 1/1968 | Skarin | A21B 1/48 198/430 |
| 3,497,084 A * | 2/1970 | Murrah | B21B 39/002 100/7 |
| 3,570,647 A * | 3/1971 | Meikle | B21D 43/006 198/430 |
| 3,955,334 A | 5/1976 | Wild et al. | |
| 5,454,464 A * | 10/1995 | Yamamoto | B65G 47/1485 198/384 |
| 6,390,272 B1 | 5/2002 | Tsutsui | |
| 6,419,076 B1 | 7/2002 | Tsutsui | |
| 6,499,280 B1 | 12/2002 | Tsutsui | |
| 6,651,800 B2 | 11/2003 | Baclija et al. | |
| 7,070,039 B2 * | 7/2006 | Dombek | A24C 5/326 198/430 |
| 7,392,630 B2 * | 7/2008 | Ford | B65B 21/06 198/419.2 |
| 8,596,446 B2 * | 12/2013 | Biggel | B65B 35/246 198/419.2 |
| 9,346,628 B2 * | 5/2016 | Osswald | B65G 47/848 |
| 2002/0157348 A1 | 10/2002 | Hiramoto et al. | |
| 2003/0216235 A1 | 11/2003 | Resterhouse | |
| 2005/0082142 A1 * | 4/2005 | Voigtmann | B29C 31/002 198/475.1 |
| 2013/0105280 A1 | 5/2013 | Warecki et al. | |
| 2015/0328855 A1 * | 11/2015 | Honda | B31D 5/0073 53/403 |
| 2017/0137233 A1 * | 5/2017 | Mart Sala | B65G 29/00 |

FOREIGN PATENT DOCUMENTS

| | | |
|---|---|---|
| EP | 0872421 A1 | 10/1998 |
| EP | 1035022 A1 | 9/2000 |
| EP | 1886944 A2 | 2/2008 |
| EP | 1958898 A1 | 8/2008 |
| JP | 10202768 A | 8/1998 |
| WO | 2005058704 A1 | 6/2005 |

* cited by examiner

DEVICE AND METHOD FOR FEEDING POUCHES TO A CAROUSEL

TECHNICAL FIELD

The present disclosure provides a device and a method for feeding to a carousel pouches intended to contain liquid, viscous or granular products.

BACKGROUND

Flexible pouches provided with specific dispensing spout are well known for containing food products such as, for example, drinks or granular products.

The pouches are usually connected to the spout upstream of a filling zone. In order to speed up production, this task is performed in continuously operating rotating carousels.

For this purpose, a system is known that comprises a rotating organ that repeatedly picks up from two distinct accumulators a pouch and a corresponding spout, transferring the pouch and spout to a rotating carousel. This system is based on a hypocycloidal mechanism that enables it to be avoided that there are relative velocities at the zone in which the rotating organ picks up the pouches and the spouts from the accumulators and at the zone of transfer of the pouches and spouts to the carousel.

The rotating organ comprises a rotatable plate and gripping means that rotate along a rotation axis that in turns rotates around the rotation axis of the plate.

One drawback of this constructional solution is the fact that at each revolution of the plate a pouch and a corresponding spout are transferred to the carousel.

In order to speed up productivity further, the number of the rotating organs indicated above should be increased, but in this manner also the constructional complexity and production costs would grow.

In this context, the technical task that is the basis of the present disclosure is to propose a device and a method that overcome the drawbacks of the cited prior art.

SUMMARY

In particular, the present disclosure provides a device and a method that enables productivity to be increased by minimizing plant costs. The advantages specified are substantially attained by providing a device and a method, comprising the technical characteristics as set out in one or more of the accompanying claims.

BRIEF DESCRIPTION OF THE DRAWINGS

Further features and advantages of the present disclosure will become clearer from the indicative and thus non-limiting description of a preferred but non-exclusive embodiment of a device, as illustrated in the attached drawings, in which.

DETAILED DESCRIPTION OF THE DRAWINGS

Figure 1:
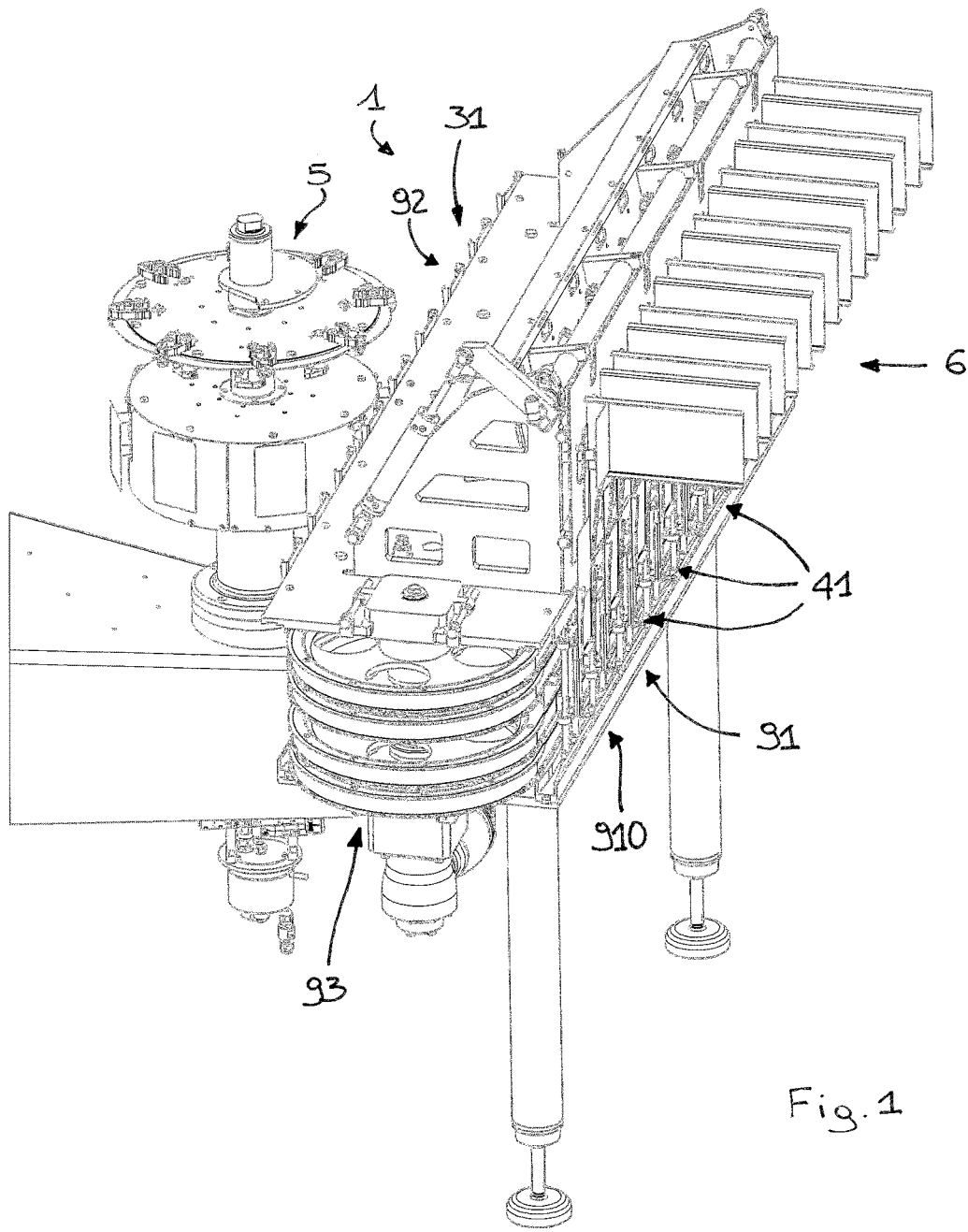
FIG. 1 shows a perspective view of a device according to the present disclosure.

In the accompanying figures, a device 1 for feeding pouches is intended to contain liquid, viscous or granular products. The device 1 comprises a plurality of magazines 60 of the pouches. These magazines 60 are accumulators of the pouches.

Preferably, the magazines 60 receive the pouches that are still devoid of the spout when the latter is subsequently connected. Advantageously, the magazines extend alongside in a row.

The device 1 further comprises a rotating carousel 5. The rotating carousel 5 receives the pouches coming from the magazines 60.

The carousel 5 advantageously comprises pouch gripping means.

Advantageously, the gripping means are suction retaining means (also known in the industry as suction cups).

In regular operation it is important for the carousel 5 to rotate at a constant rotation velocity.

The device 1 further comprises first feeding means 3 for feeding the pouches from said plurality of magazines 60 to said rotating carousel 5. The device 1 further comprises second feeding means 4 for feeding the pouches from said plurality of magazines 60 to said rotating carousel 5. Suitably, the first feeding means 3 comprises a first conveyor. Preferably, the first conveyor follows an annular trajectory. Advantageously, the first conveyor comprises a plurality of first housings 32 for the pouches. For example, the first conveyor comprises a belt or a chain to which the first housings 32 are connected. Below, what is disclosed with explicit reference to the belt could also be repeated in the case of the presence of a chain.

Figure 4:
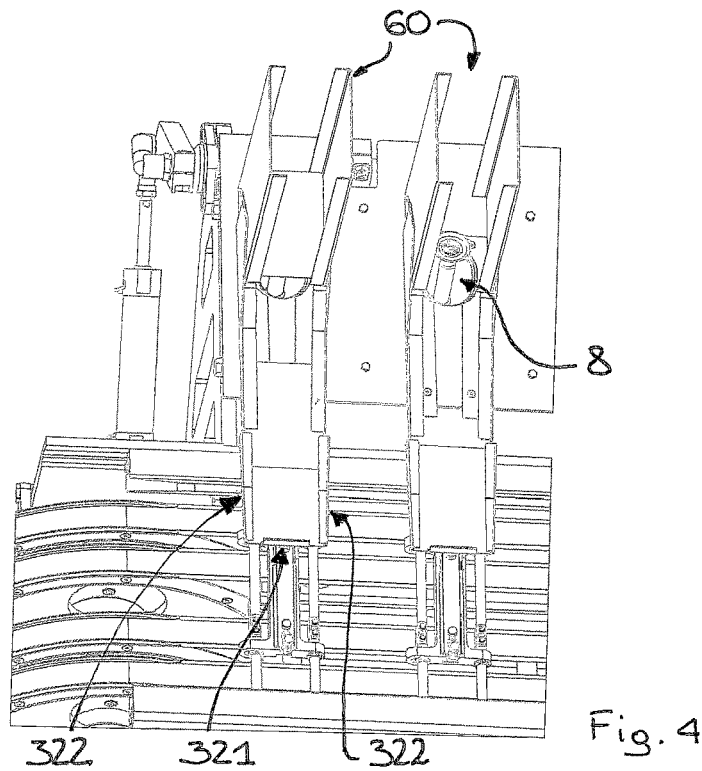
FIGS. 3 and 4 show two perspective views in different configurations of a detail of a device according to the present disclosure.
Figure 3:
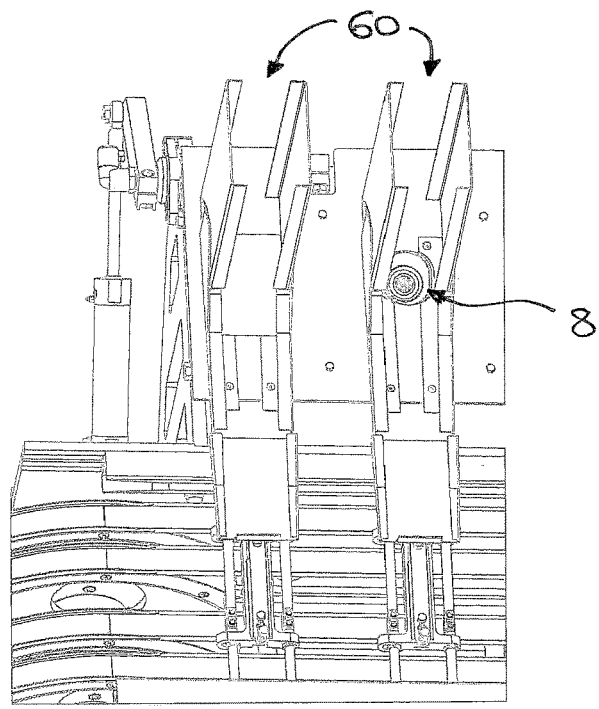

In the exemplified solution in FIG. 3 or 4 the first housings 32 are shaped as pockets. The pockets are open at the top and comprise a lower rest 321 and two side grooves 322 for retaining the pouches. The portion of the pockets intended to face the carousel 5 is open to enable the pouch to be extracted.

Suitably, the device 1 comprises adjustment means for adjusting the height of the first housings 32.

Similarly, the second feeding means 4 comprises a second conveyor. Suitably, the second conveyor can comprise a plurality of second housings 42 for supporting the pouches. What has been disclosed with reference to the first conveyor can be repeated for the second conveyor.

Similarly, what has been disclosed with reference to the first housings 32 can be repeated for the second housings 42.

The device 1 further comprises synchronization means for synchronizing the movement of the first feeding means 3 with respect to the second feeding means 4.

In this manner, downtime is minimized during carousel 5 feeding.

The first feeding means 3 comprise a first zone 31 for receiving the pouches.

Similarly, the second feeding means 4 comprise a second zone 41 for receiving the pouches.

In a first configuration in which the first zone 31 is located at the loading station 6, the carousel 5 interacts with the second zone 41.

In a second configuration in which the first zone 31 is immediately queued behind the second zone 41, the carousel 5 still interacts with the second zone 41.

Similarly, in a configuration in which the second zone 41 is placed at the loading station 6, the carousel 5 interacts with the first zone 31.

In the exemplified but non-limiting solution of the accompanying figures the first and the second conveyor respectively comprise a first and a second belt that are operationally coupled with first and second end rotating means (for example, one or more pulleys). The first and second belt between the two end rotating units extend along a first and a second rectilinear line 91, 92 whereas at the first and the second end rotating means the first and the second belt extend along a curved line. The loading station 6 is at the first rectilinear line 91 and the carousel 5 is at the second rectilinear line 92. Opportunely, the device 1 comprises a first belt guide 910 and a second belt guide 920. The first and the second guide 910, 920 extend respectively at the first and the second rectilinear line 91, 92.

The present disclosure provides a method of feeding to a carousel 5 pouches intended for containing liquid, viscous or granular products. One or more steps of this method are advantageously implemented by a device 1 having one or more of the features disclosed above. These pouches are flexible pouches, which are typically made of two impermeable sheets between which the product is placed. Possibly, there can be a support base that extends transversely to the sheets. A container using a pouch of this type can also comprise a stiff spout for dispensing product that is—in part interposed between the two sheets.

The carousel 5 advantageously operates continuously so as to maximize productivity.

The method comprises the step of positioning a plurality of pouches 2 along a first zone 31 that is part of first feeding means 3 feeding the pouches 2 to the carousel 5. Preferably, the step of positioning a plurality of pouches 2 along the first zone 31 comprises the step of positioning said pouches 2 in first housings 32 placed in succession along said first feeding means 3. Opportunely, the first housings 32 extend one after the other with respect to an advancement direction of the first feeding means 3. The pitch between the first housings 32 is substantially constant. The step of positioning a plurality of pouches 2 in the first zone 31 occurs in a loading station 6.

The first feeding means 3 can comprise a first conveyor that moves along an annular trajectory. The first conveyor can comprise a chain/belt that determines the movement of the first housings 32. Preferably, the positioning of all the pouches 2 along the first zone 31 occurs simultaneously.

Preferably, the step of positioning a plurality of pouches 2 along the first zone 31 envisages releasing a plurality of pouches 2 from magazines 60 (that are located in the same loading station 6). The magazines 60 contain a plurality of stacked pouches. Advantageously, the magazines 60 extend alongside one another along the advancement direction of the first feeding means 3. Advantageously, the pouches 2 are dropped by gravity into said first zone 31. More in particular, the step of positioning said plurality of pouches along the first or second zone 31, 41 envisages picking up the pouches 2 by suction means 8 and then dropping the pouches 2 by gravity.

The pouch is then guided downwards to enable the pouch to be inserted inside one of the first housings 32 of the first zone 31.

During the step of positioning a plurality of pouches 2 along the first zone 31, the first zone 31 is stationary (thus also the first conveyor). Typically, in this step each first housing 32 is below a corresponding magazines 60.

Subsequently, the method comprises the step of moving the pouches 2 located in said first zone 31 as far as the carousel 5. The step of moving the pouches located in the first zone 31 as far as the carousel 5 envisages moving said first zone 31 to the carousel 5.

At this point, the method comprises the step of picking up the pouches from the first zone 31 by means of said carousel 5. The pouches 2 are picked up in succession. Suitably, the advancement velocity of the first zone 31 at the carousel 5 is substantially the same as the peripheral velocity of the carousel 5. In this manner the carousel 5 can pick up the pouches 2 without being hindered by a possible significant velocity difference at the removal zone.

After the step of picking up the pouches 2 from the first zone 31 by means of the carousel 5, the method comprises the step of repositioning said first zone 31 at the loading station 6 to receive other pouches 2 to be conveyed to the carousel 5. The method further comprises the steps of positioning a plurality of pouches 2 along a second zone 41 that is part of second feeding means 4 for feeding the pouches 2 to the carousel 5 (this configuration is illustrated in FIG. 1).

The step of positioning a plurality of pouches 2 along the second zone 41 occurs at least in part at the same time as the step of picking up the pouches 2 from the first zone 31 (see again FIG. 1).

The step of positioning a plurality of pouches 2 along the second zone 41 comprises the step of positioning said pouches 2 in second housings 42 placed in succession along said second feeding means 4.

The second feeding means 4 can comprise a second conveyor that moves along an annular trajectory. The second conveyor can comprise a chain/belt that determines the movement of the second housings 42 in which the pouches 2 are positioned. The step of positioning a plurality of pouches 2 in the second zone 41 occurs in the loading station 6. The loading station 6 is thus common to the first and second feeding means. Opportunely, what has been disclosed with reference to the positioning of the pouches 2 in the first zone 31 can be repeated for positioning pouches 2 in the second zone 41. Opportunely, the step of positioning the pouches in the first and/or in the second zone 31, 41 envisages placing the pouches 2 vertically or any way in such a manner as to form an angle that is 20° less than the vertical angle.

The method further comprises the step of moving the pouches 2 located in said second zone 41 as far as the carousel 5. The step of moving the pouches 2 located in said second zone 41 to the carousel 5 envisages moving the second zone 41 to the carousel 5. The step of queuing the pouches 2 of the second zone 41 behind the pouches 2 of the first zone 31 occurs during the step of picking up the pouches 2 from the first zone 31 by means of the carousel 2.

The second zone 41 moves along an annular trajectory, passing through the loading station 6 and the carousel 5. Advantageously, the second zone 41 travels along this trajectory always in the same advancement direction.

Opportunely, the first zone 31 and the second zone 41 (advantageously the first and the second housings 32, 42) move along the same trajectory or any way along parallel trajectories. As exemplified in the figures, the first and the second conveyor are alongside (preferably superimposed).

In particular, in the exemplified solution illustrated in the accompanying figures, the first and the second conveyor comprise respectively a first and a second belt to which the first and the second housings 32, 42 are respectively connected. In particular, the first conveyor comprises a pair of belts (the first and the third from the bottom in FIG. 1 or 2) to which the first housings 32 are connected. The second conveyor on the other hand comprises a second pair of belts (the first and the third from the top in FIG. 1 or 2) to which the second housings 42 are connected. The steps 8 of moving the pouches 2 located in said first zone 31 and in said second zone 41 as far as the carousel 5 envisages moving the pouches 2 and maintaining the pouches 2 at the same height with respect to a horizontal imaginary plane. For this purpose, advantageously the first and the second housings 32, 42 all lie at the same height, and in particular they are identical to one another. Opportunely, the first housings 32 extend in succession along the first feeding means 3 for less than a third of the annular trajectory travelled along by the first feeding means 3. Similarly, the second housings 42 extend in succession along the second feeding means 4 for less than a third of the annular trajectory travelled along by the second feeding means 4.

The method further envisages picking up the pouches 2 from the second zone 41 by means of the carousel 5.

The step of picking up the pouches 2 from the second zone 41 occurs immediately after the step of picking up the pouches 2 from the first zone 31. Opportunely, this occurs without interrupting rotation of the carousel 5. The carousel 5 picks up (in succession) the pouches 2 located in said second housings 42.

After the step of picking up the pouches 2 from the second zone 41 by means of the carousel 5 the second zone 41 is repositioned at the loading station 6 to receive other pouches 2 to be conveyed to the carousel 5.

The step of repositioning said second zone 41 at the loading station 6 is accompanied by repositioning of the first zone 31 at the carousel 5 and by the transfer of pouches from the first zone 31 to the carousel 5.

Repositioning of the first zone 31 at the carousel 5 is preceded by the step of queueing, upstream of the carousel 5, the first zone 31 behind the second zone 41.

This occurs during the step of picking up the pouches from the second zone 41 by means of the carousel 5 and after said step of repositioning said first zone 31 at the loading station 6.

During the step of picking up the pouches from the second zone 41 by means of the carousel 5, the first zone 31 moves from the carousel 5 to the loading station 6 to pick up other pouches and then queues up behind the second zone 41 upstream of the carousel 5 to enable new pouches to be fed to the carousel 5. During the step of picking up the pouches 2 from the first zone 31 by means of the carousel 5, the second zone 41 moves from the carousel 5 to the loading station 6 to pick up other pouches and then queues up behind the first zone 31 upstream of the carousel 5 to release again the pouches to the carousel 5.

The pitch existing between the pouches located in the first zone 31 is substantially the same as the pitch of the pouches located in the second zone 41.

The step of moving the pouches 2 positioned in the second zone 41 as far as the carousel 5 comprises the step of moving the pouches along a travel path comprising a first portion in which the second feeding means 4 is moved at a greater average velocity than a second travel path portion.

The first portion affects a portion of the travel path interposed between the loading station 6 and a reference (which may also be imaginary) in which the second zone 41 is queued behind the first zone 31.

During said second travel path portion the pouches 2 located along the second feeding means 4 are immediately queued behind the pouches 2 located along the first feeding means 3. The distance between the last pouch 2 located in the first zone 31 and the first pouch 2 located in the second zone 41 is substantially the same as the pitch of the pouches 2 located in the first and/or in the second zone 31, 41 (there could possibly be differences that are less than 10% of the pitch existing between the pouches 2 located in the first zone 31). The assessment of the distance between the last pouch 2 located in the first zone 31 and the first pouch 2 located in the second zone 41 occurs at the carousel 5; the first pouch located in the second zone 41 is defined on the basis of the order of approach to the carousel 5 of the pouches located in the second zone 41;

the last pouch 2 located in the first zone 31 is defined on the basis of the order of approach to the carousel 5 of the pouches 2 located in the first zone 31.

The carousel 5 further comprises a plurality of pouch picking stations; the first pouch located in the second zone 41 is picked up by the picking station immediately after the picking station that picks up the last pouch in the first zone 31. The carousel 5, when it has finished picking up the pouches 2 located in said first zone 31, can thus pick up the pouches 2 located at said second zone 41 without interrupting service and thus optimizing productivity. The first and second pouch mentioned previously are to be assessed with reference to the direction of advancement of the pouches 2 between the loading station 6 and the carousel 5. In the exemplified and non limiting solution of the accompanying figures, the trajectory defined by the first and by the second zone 31, 41 is a circuit comprising a first and a second rectilinear line 91, 92 and two curved portions 93, 94 that connect the first and second rectilinear line 91, 92. Opportunely, the loading station 6 is placed at the first rectilinear line 91 whilst the carousel 5 is located at the second rectilinear line 92.

During the step of repositioning said second zone 41 at the loading station 6 the second feeding means 4 moves on average faster than in said second portion. In fact, in this step the second feeding means 4 is devoid of pouches and so transfer time has to be reduced.

Once said second zone 41 is located at said loading station 6 the method envisages positioning the pouches at the second zone 41.

Opportunely, the step of positioning the pouches 2 at the second zone 41 occurs at least in part simultaneously with the step of removing the pouches from the first zone 31 by means of said carousel 5. During the step of repositioning said second zone 41 at the loading station 6 the method envisages picking up the pouches from the first zone 31 by means of said carousel 5.

Figure 2:
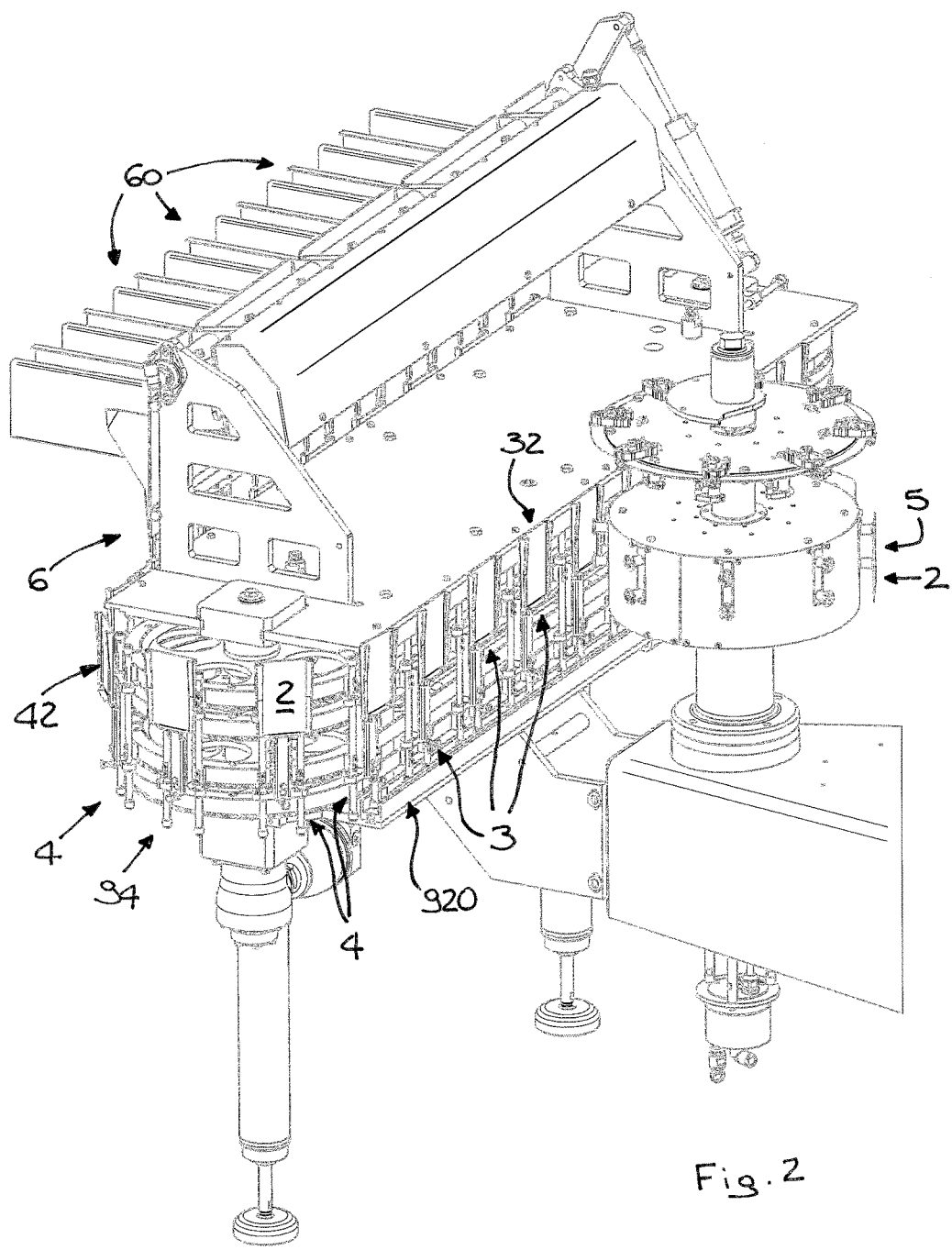
FIG. 2 shows a perspective view of a device according to the present disclosure in a different configuration.

The method then envisages queuing the pouches 2 located in the second zone 41 behind the pouches 2 located in the first zone 31 and which are now located at the carousel 5 (this configuration is illustrated in FIG. 2). In this manner, continuity of picking up by the carousel 5 is assured. During the step of queuing the pouches 2 located in the second zone 41 behind the pouches 2 located in the first zone 31 the method envisages picking up the pouches from the first zone 31 by means of the carousel 5. In general, the carousel 5 is fed with regularity and picks up the pouches either from the first zone 31 or from the second zone 41.

The method advantageously uses at least the first and second feeding means 3, 4 that transfer the pouches from the loading station 6 to the carousel 5, but further feeding means could possibly be present (for example, a third belt provided with additional housings for the pouches). The disclosure as it is conceived enables multiple advantages to be attained.

In particular, it enables productivity to be speeded up by providing a plant that can be easily modulated according to the user's actual needs. In fact, the increase of productivity can be based on increasing the number of parallel magazines from which the first and second feeding means 3, 4 pick up the pouches. This has fairly moderate structural costs.

The disclosure as conceived is susceptible to numerous modifications and variants, all falling within the scope of the inventive concept characterized thereby. Furthermore all the details can be replaced by other technically equivalent elements. In practice, all the materials used, as well as the dimensions, can be any according to requirements.

The invention claimed is:

1. A method for feeding pouches from a plurality of magazines to a rotating carousel which comprises pouch picking stations, said method comprising the steps of:
    releasing a first plurality of pouches from said magazines and positioning said first plurality of pouches along a first zone comprised in first means for feeding the pouches from said magazines to the carousel, said first means comprising a first conveyor that is moveable along an annular trajectory;
    moving the first plurality of pouches along the first zone to the carousel, comprising moving the first zone toward the carousel by moving said first conveyor along said annular trajectory;
    picking up the first plurality of pouches from the first zone by means of the carousel;
    further including the steps of:
    releasing a second plurality of pouches from said magazines and positioning said second plurality of pouches along a second zone comprised in second means for feeding the second plurality of pouches from said magazines to the carousel, said second means comprising a second conveyor that is moveable along an annular trajectory;
    moving the second plurality of pouches along the second zone toward the carousel, queuing the second plurality of pouches behind the first plurality of pouches along the first zone, the step of queuing taking place during the step of picking up first plurality of pouches from the first zone by means of the carousel; the step of moving the second plurality of pouches along the second zone toward the carousel including moving the second zone toward the carousel by moving said second conveyor along said annular trajectory; and picking up the second plurality of pouches from the second zone by means of the carousel,
    wherein, during the step of positioning said second plurality of pouches along said second zone, the second zone is stationary and, during at least part of the step of positioning said second plurality of pouches along said second zone, an advancement velocity of the first zone at the carousel is substantially the same as a peripheral velocity of the rotating carousel.

2. The method according to claim 1, wherein the step of positioning said plurality of pouches in the first zone takes place in a loading station;
    after the step of picking up the first plurality of pouches from the first zone by means of the carousel, the method comprising the step of repositioning the first zone at the loading station to receive other pouches to be conveyed to the carousel; at least during the step of repositioning the first zone at the loading station, the method comprising said step of picking up the second plurality of pouches from the second zone by means of the carousel;
    the step of positioning said second plurality of pouches along the second zone taking place in said loading station; after the step of picking up the second plurality of pouches from the second zone by means of the carousel, the method comprises the step of repositioning the second zone at the loading station to receive other pouches to be conveyed to the carousel; the step of repositioning the second zone at the loading station being accompanied by a repositioning of the first zone at the carousel and a transfer of pouches from the first zone to the carousel.

3. The method according to claim 2, wherein the repositioning of the first zone at the carousel is preceded by a step of placing, upstream of the carousel, the first zone in queue behind the second zone during the step of picking up the second plurality of pouches from the second zone by means of the carousel and after said step of repositioning the first zone at the loading station.

4. The method according to claim 1, wherein the step of positioning said first plurality of pouches along the first zone comprises a step of positioning said first plurality of pouches in first housings disposed in succession along the first feeding means; the carousel picking up in succession the first plurality of pouches along said first housings;
    the step of positioning said second plurality of pouches along the second zone comprises the step of positioning said second plurality of pouches in second housings disposed in succession along said second feeding means; the carousel picking up in succession the second plurality of pouches along said second housings.

5. The method according to claim 1, wherein the step of moving the second plurality of pouches positioned in the second zone to the carousel comprises the step of moving the second zone along a travel path comprising a first part in which the second feeding means are moved at higher average velocity than in a second part in which the second plurality of pouches placed along the second feeding means are immediately queued behind the first plurality of pouches placed along the first feeding means.

6. The method according to claim 1, wherein the step of positioning said first plurality of pouches along the first zone comprises the steps of:
    releasing said first plurality of pouches from adjacent magazines; and
    allowing said first plurality of pouches to fall by gravity into the first zone, the first zone being stationary during the step of positioning said first plurality of pouches along the first zone.

7. The method according to claim 1, wherein the first and second zones move annularly along a same trajectory or along two parallel trajectories.

8. The method according to claim 1, wherein the steps of moving the pouches along the first and second zones to the carousel envisage that:
    a first pitch existing between the first plurality of pouches along the first zone is substantially equal to a second pitch between the second plurality of pouches along the second zone;
    the distance between the last pouch along the first zone and the first pouch along the second zone is substantially equal to the pitch of the pouches along the first and second zones;
    the first pouch along the second zone being defined based on the order of approach to the carousel; the last pouch along the first zone being defined based on the order of approach to the carousel.

9. A device for feeding pouches, comprising:
    a first plurality of pouches;
    a second plurality of pouches;
    a plurality of magazines configured to receive the first plurality of pouches and the second plurality of pouches;
    a rotating carousel configured to receive the first plurality of pouches and the second plurality of pouches from said plurality of magazines;

first means for feeding the first plurality of pouches from said plurality of magazines to said rotating carousel;

second means for feeding the second plurality of pouches from said plurality of magazines to said rotating carousel; and means for synchronizing the movement of the first feeding means with respect to the second feeding means to enable the device to take on at least:

i) a first configuration in which a first zone of the first feeding means is stationarily placed in the loading station and a second zone of the second feeding means is placed at the rotating carousel and moves with an advancement velocity which is substantially the same as a peripheral velocity of the rotating carousel; and ii) a second configuration in which the first zone is queued behind the second zone and the second zone is placed at the rotating carousel and moves with said advancement velocity.

* * * * *